(12) United States Patent
Smith

(10) Patent No.: US 6,605,368 B2
(45) Date of Patent: Aug. 12, 2003

(54) COOKWARE VESSEL

(76) Inventor: Laura Lisa Smith, 2 Fifth Ave., Apt. 24, New York, NY (US) 10011

( * ) Notice: Subject to any disclaimer, the term of this patent is extended or adjusted under 35 U.S.C. 154(b) by 22 days.

(21) Appl. No.: 09/742,614

(22) Filed: Dec. 21, 2000

(65) Prior Publication Data
US 2002/0046659 A1 Apr. 25, 2002

Related U.S. Application Data

(60) Provisional application No. 60/172,817, filed on Dec. 21, 1999.

(51) Int. Cl.⁷ .............................. B32B 5/20; B32B 5/18; A47J 36/02; B22F 1/00; B22D 25/06
(52) U.S. Cl. ...................... 428/613; 419/9; 220/912; 99/447
(58) Field of Search .................... 428/613; 220/912; 99/442, 447; 164/79, 80; 419/2, 5, 6, 8, 9, 28; 126/390; 75/415

(56) References Cited

U.S. PATENT DOCUMENTS

| | | | |
|---|---|---|---|
| 2,765,728 A | * 10/1956 | Pearce | 126/390.1 |
| 3,711,363 A | * 1/1973 | Jarema | 428/309.9 |
| 3,742,174 A | * 6/1973 | Harnden, Jr. | 219/445.1 |
| 3,834,881 A | * 9/1974 | Niebylski | 428/613 |
| 3,929,425 A | * 12/1975 | Valdo | 138/106 |
| 4,850,339 A | * 7/1989 | Ghatak | 126/681 |
| 4,973,358 A | 10/1990 | Jin et al. | 75/415 |
| 5,151,246 A | 9/1992 | Baumeister et al. | 419/2 |
| 5,507,220 A | * 4/1996 | Jung | 126/375.1 |
| 5,564,064 A | * 10/1996 | Martin | 29/527.1 |
| 5,865,237 A | 2/1999 | Schörghuber et al. | 164/79 |
| 6,135,542 A | * 10/2000 | Emmelmann et al. | 296/187 |

FOREIGN PATENT DOCUMENTS

| | | | |
|---|---|---|---|
| DE | 29907193 U1 | * 12/1999 | |
| WO | WO 00/54638 | * 9/2000 | |

* cited by examiner

Primary Examiner—John J. Zimmerman
(74) Attorney, Agent, or Firm—Collard & Roe, P.C.

(57) ABSTRACT

The invention relates to an improved cookware vessel and a method of manufacturing the same. The cookware vessel comprises an inner core body of a foamable metal, and an outer shell surface of a non-porous metal. The shell surface may employ a finishing material suitable for use with food products. This construction provides a cookware vessel having a decreased weight and increased conductivity compared to other cookware vessels currently on the market.

10 Claims, 12 Drawing Sheets

Run 1-12

Run 1-15

Run 1-19

COOKWARE VESSEL

This application is based on U.S. Provisional Patent Application Ser. No. 60/172,817 filed Dec. 21, 1999.

BACKGROUND OF THE INVENTION

1. Field of the Invention

This invention relates to a process for manufacturing an improved cookware vessel. The process consists of manufacturing such items from foamable metal bodies.

2. The Prior Art

U.S. Pat. No. 5,151,246 to Baumeister et al. discloses a method for manufacturing foamable metal bodies. This method consists of mixing metal powder and gas-splitting propellent powder and hot compacting the mixture to a semi-finished product at a temperature at which the joining of the metal powder particles takes place primarily by diffusion. The pressure is sufficiently high to hinder the decomposition of the propellant so that the metal particles form a solid bond with one another and constitute a gas tight seal for the gas particles of the propellant. This patent is hereby incorporated by reference.

SUMMARY OF THE INVENTION

This invention employs the above described material to produce an improved cookware vessel that can be heated by cooking, broiling, boiling, grilling or baking. The vessel can be manufactured in any size or shape. The method of manufacturing can be accomplished by the use of any metal, or combination of metals. Aluminum, aluminum alloys, copper, all ferrous alloys, cast iron, alloy steel, stainless steel, carbon steel, or iron based super alloys can be used. The vessel may incorporate one metal for the faces and the core or may employ one metal on the faces and another for the core. For example one embodiment may be a stainless steel solid outside shell or fascia bonded to an aluminum metal foam core. The weight of a solid steel shell and solid aluminum core when compared to solid steel shell and porous foam aluminum core can reduce the weight of the cookware by 25–40%. (Finite Element Analysis) FEA indicate that a solid steel outside shell and a core of aluminum foam would result in a similar conductivity to solid steel of the same overall thickness with a significant decrease in weight. Another combination is non-porous aluminum outsider layer or shell with a porous aluminum foam core. This would result in a considerable reduction in weight without compromising conductivity greatly depending on the density of the foamable aluminum and the use for which the vessel is intended.

An advantage of manufacturing a cookware vessel from foamable metals is the significant decrease in the weight of the cookware vessel. FEA analysis was completed with a non-porous metal shell (outside layer) and a core of porous metal foam of various material combinations and thicknesses. Comparative heat conductive and weight analyses have been made on various configurations where metal foam is involved. Optimal thickness of the non-porous shell and metal foam core densities are determined when samples are made for different cooking vessels and tested for optimum conditions. Sandwich structures composed of a porous metallic foam core and metallic face sheets can be produced, with options exploiting combined materials and shapes. Typical foaming processes include casting, powder pressing, powder metallurgy, metallic deposition and sputter deposition. Following the metalworking steps, the foamable material is heated to temperatures near the melting point of the matrix material. During heating, the foaming agent decomposes, and the released gas forces the densified material to expand into a highly porous structure. The density of the metal foams can be controlled by adjusting the content of the foaming agent and several other foaming parameters, such as temperature and heating rate. Different alloys can be foamed by selecting appropriate foaming agents and process parameters. The bonding of a face sheet to the metal foam core would be accomplished by brazing, soldering, diffusion bonding, welding (inert gas welding, laser welding, vibration welding) or roll cladding. Sandwich panels consisting of a foamed metal core and face sheets can be fabricated by bonding the face sheets to the core in the above mentioned methods.

The powder metallurgy production method makes it possible to build metallic foam parts that have complex geometry. Sandwich structures composed of porous metallic foam core and metallic face sheets can also be produced, with options exploiting combined materials and shapes. The material may be foamed into complex shapes by inserting the foamable material into a hollow mold and expanding it through heating. Sandwich panels consisting of a foamed metal core and solid face sheets may be fabricated by bonding the face sheets onto a foam core. If pure metalic bonding is required, face sheets and foamable material can be roll-clad to make a sandwich structure before foaming. The metal foam sandwich process has the advantage of enabling not only flat panels but also true three dimensional shapes by e.g. deep drawing or other forming process prior to the foaming.

The non-porous fascia or surface of the foamable metal product may be hot dipped, electroplated enameled electroless plated, plasma sprayed, vacuum metalized, sputtered, metal powdered, flame sprayed, or treated with any variety of finishes that are acceptable for food services products. The cookware can be used on a gas, convection, electric, or induction heat oven or stove.

A cookware vessel employing a solid, non-porous, outer layer with a foamable metal core is significantly lighter when compared to other metal cookware that combine steel and solid aluminum currently on the market. The FEA results indicate that the porous aluminum core provides better radial heat transfer than the porous steel material, with the solid aluminum providing the best performance. After 100 seconds the temperature differences are more significant with air boundary conditions than in water boundary conditions. Therefore a large pot for boiling water or cooking stews would be suitable employing a porous aluminum core with 50% porosity. When cooking with a limited amount of liquid, the air boundary conditions would apply, requiring a more dense metal foam core.

All FEA analyses within this study used a medium gas flame heat source. Appliances using induction heat, electric resistance and convective heating sources will present relatively constant heat distributions over the entire heating surface of the cookware product, thus resulting in minimal if any "hotspots" regardless of the cooking material. FEA analysis simulating induction heat, electric resistance and convective heating were not performed because it was assumed that these results would show a constant heat distribution with minimal hotspots across the cooking surface. The porous material heats up faster than the solid material due to its lower density (thus requiring less energy).

Air boundary conditions present the worst scenario for developing a hot spot. Water boundary conditions, such as soup, water, etc. will not have the severe hot spots as those present in the air environment because these cooking materials will draw the heat out of the cookware material much faster than an air environment only. The air boundary condition may only present during the heating prior to placing the cooking material inside the cookware. Therefore, the water boundary condition results may be of more benefit for evaluating the optimum porous material thickness. Results from the water boundary condition indicate small temperature variations over the heating surface for different porous material thickness. Although if we consider the air boundary conditions, based solely on heat transfer, it can be concluded that the largest amount of porous material should be used on vessels that will hold liquids, soups, etc. to achieve the lightest cookware product. In water boundary conditions, there is a relatively small temperature variation (hot spot) on the heating surface, regardless of the amount of porous material. The temperature magnitude is relatively low compared to the air results due to the higher heat loss to the medium in contact with the heating source. The FEA runs with water boundary conditions assumed that the water was already boiling (110 C). The results indicated much lower hot spots than those indicated from the air runs. Thus concluding that the air boundary conditions are the worst case situation and that any cooking condition (soup, steak, etc.) would present fewer hot spots. With water boundary conditions, there is relatively small temperature variation (hot spot) on the heating surface, regardless of the amount of porous material.

With vessels with higher rims that would traditionally hold soups, stews, boiling water, pasta, etc. where the water boundary conditions apply, the maximum size porous metal foam and the minimum amount of face sheet would be incorporated. In these conditions the material inside the vessel is helping to heat the metals. Vessels intended for frying or saute with a 2" rim height should incorporate a higher density metal foam with a minimum solid face sheet for optimum conductivity and minimum hot spots. All variations that incorporate metal foam decrease the weight of the cookware.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

DETAILED DESCRIPTION OF THE PREFERRED EMBODIMENT

Figure 1A:
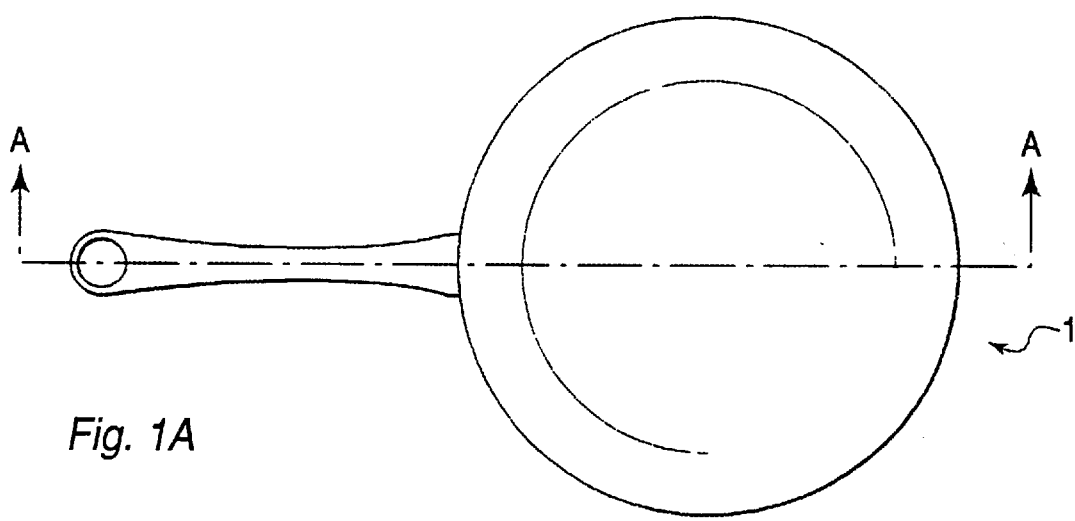
FIG. 1A shows a top view of the cookware vessel.
Figure 1B:
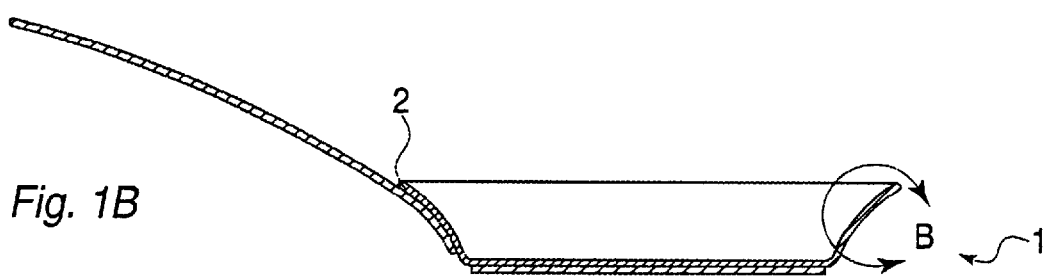
FIG. 1B shows a cross sectional view of the cookware vessel in 1A.
Figure 1C:
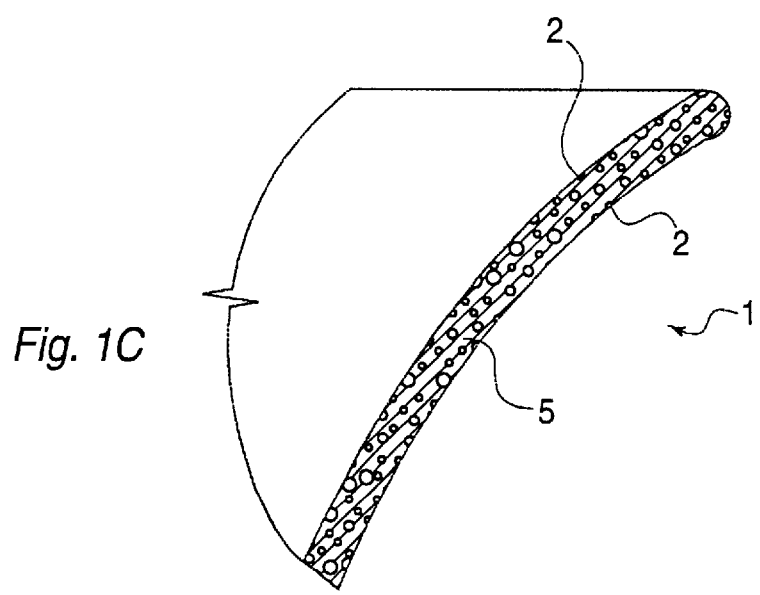
FIG. 1C shows a detailed view of the layers of the cookware vessel in 1B.

Referring now in detail to the drawings, FIG. 1A shows a top view of a typical cookware vessel 1. FIG. 1B shows a cross sectional view along AA of FIG. 1A. Non-porous surface 2 of vessel 1 contains a finished surface so that it is suitable for use with food products. This vessel can be used in stovetops, convection ovens, induction ovens, or conventional ovens. FIG. 1C shows foam bubbles 5 within vessel 1.

Typical foaming processes include casting, powder pressing, powder metallurgy, metallic deposition and sputter deposition. Following the metalworking steps, the foamable material is heated to temperatures near the melting point of the matrix material. During heating, the foaming agent decomposes, and the released gas forces the densified material to expand into a highly porous structure. The density of the metal foams can be controlled by adjusting the content of the foaming agent and several other foaming parameters, such as temperature and heating rate. Different alloys can be foamed by selecting appropriate foaming agents and process parameters. The bonding of a face sheet to the metal foam core would be accomplished by brazing, soldering, diffusion bonding, welding (inert gas welding, laser welding, vibration welding) or roll cladding. Sandwich panels consisting of a foamed metal core and face sheets can be fabricated by bonding the face sheets to the core in the above mentioned methods.

The powder metallurgy production method makes it possible to build metallic foam parts that have complex geometry. Sandwich structures composed of porous metallic foam core and metallic face sheets can also be produced, with options exploiting combined materials and shapes. The material may be foamed into complex shapes by inserting the foamable material into a hollow mold and expanding it through heating. Sandwich panels consisting of a foamed metal core and solid face sheets may be fabricated by bonding the face sheets onto a foam core. If pure metalic bonding is required, face sheets and foamable material can be roll-clad to make a sandwich structure before foaming. The metal foam sandwich process has the advantage of enabling not only flat panels but also true three dimensional shapes by e.g. deep drawing or other forming process prior to the foaming.

The non-porous fascia or surface of the foamable metal product may be hot dipped, electroplated enameled electroless plated, plasma sprayed, vacuum metalized, sputtered, metal powdered, flame sprayed, or treated with any variety of finishes that are acceptable for food services products. The cookware can be used on a gas, convection, electric, or induction heat oven or stove.

A cookware vessel employing a solid, non-porous, outer layer with a foamable metal core is significantly lighter when compared to other metal cookware that combine steel and solid aluminum currently on the market. The FEA results indicate that the porous aluminum core provides better radial heat transfer than the porous steel material, with the solid aluminum providing the best performance. After 100 seconds the temperature differences are more significant with air boundary conditions than in water boundary conditions. Therefore a large pot for boiling water or cooking stews would be suitable employing a porous aluminum core with about 50% porosity or above. When cooking with a limited amount of liquid, the air boundary conditions would apply, requiring a more dense metal foam core.

The vessel is manufactured by forming a metal foam core and applying a shell of non-porous material to the foam core. The shell layer can also be achieved during the foaming process. A layer of finishing material is applied to the shell, this material being suitable for use with food products.

Finite Element Analysis was performed using a two-dimensional axi-symmetric thermal model using ABAQUS software. The FEA must account for the geometry of the analyzed component, a finite element mesh, boundary conditions, and material properties.

Figure 2:
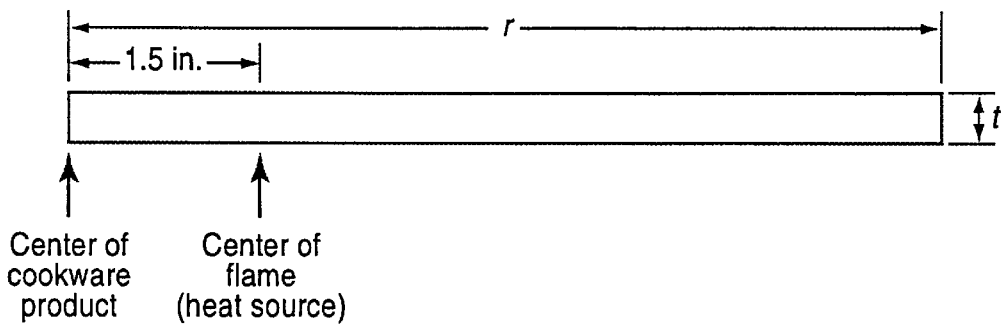
FIG. 2 shows the center of the flame with respect to the center of the cookware vessel.

For this particular analysis, the geometry is a rectangular shape representing an axi-symmetric two-dimensional slice of a flat, circular cookware product. The geometric dimensions of the finite element model (FEM) are defined in FIG. 2. The radius (r) was set at 159 mm (6.26 in.) to provide enough material to be able to identify hot spots near the heat source. FIG. 2 also shows the location of maximum heat input from the ring-shaped flame with respect to the center of the cookware product. The total thickness (t) of the FEM was initially set at 3.175 mm (0.125 in.) and 4.76 mm (0.1875 in.). Further evaluations were completed with total thickness of the product set at 4.6 mm, 3.8 mm, and 3.6 mm.

The finite element mesh is critical for obtaining accurate results. A mesh independence study was performed to identify an optimum mesh density. This study consisted of a coarse meshed model and a fine meshed model. The thermal results from both analyses were identical. All FEA models used throughout this project used mesh densities similar to the fine mesh since the run time variance between the two mesh densities was negligible. Therefore, no accuracy problems due to the mesh are anticipated.

Figure 3:
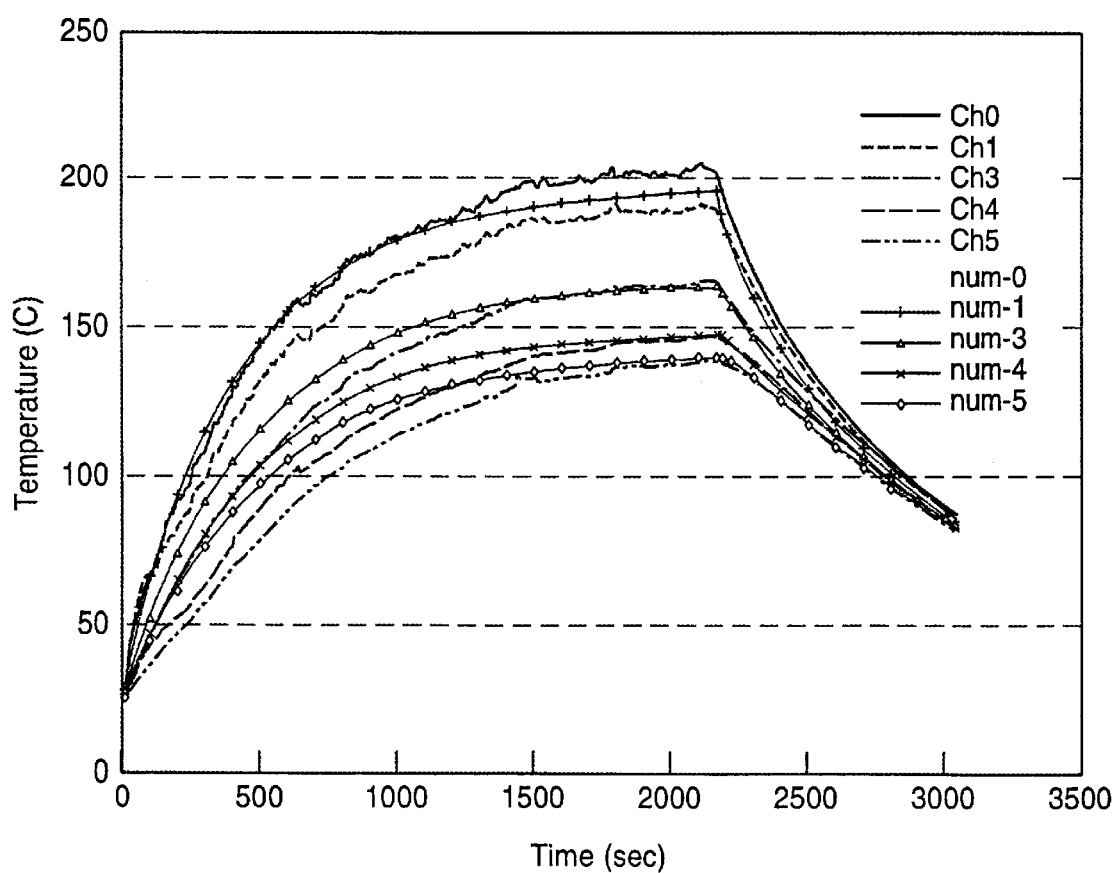
FIG. 3 shows results of numerical versus measured temperatures.

Applying accurate boundary conditions is required to obtain an accurate solution. A thermal experiment was used to calculate the heat applied from the heating source. Original plans called for thermal experiments of a heated cookware-like product with heat loss to air and water. These experiments would provide accurate boundary conditions representing the heat applied and the heat loss. A thermal experiment using a 5.3 mm thick solid steel plate provided temperature data that were used to determine the heat generated from a medium flame, and the amount of heat loss to an air environment. Heat flux applied to the bottom surface of the plate, and the subsequent convection coefficient representing heat loss to an air environment were calculated based on the thermal experiment results. These values were applied to a FEM to validate numerical accuracy. The results presented in FIG. 3 demonstrate good agreement between the numerical and experimental results, thus validating the numerical model and the applied boundary conditions. Note that the curves defined with Ch# represent the measured data, and the curve defined with num# represents numerical results.

Representing a water boundary condition is very complex. The convection coefficient increases as the temperature of the water increases. To account for the water in contact with the cooking surface, a constant convection coefficient of 1500 $W/m^{2.\circ}$ C. was used. This value is more representative of water at room temperature (convection coefficient for boiling water can range from 5000 to 8000 $W/M^{2.\circ}$ C.). The initial water temperature was assumed to be 100° C. to represent boiling water.

Both steel and aluminum materials were evaluated. Typical thermophysical properties were obtained from literature for these materials in the solid condition. Properties for steel were assumed to be similar to standard steel material as presented in ABAQUS manuals. It was assumed that the properties for aluminum were similar to 2024-T6 (4.5% Cu, 1.5% Mg, 0.6% Mn). For the porous material, thermal conductivity was assumed to be 30% of the solid material, while the density was assumed to be 50% of the solid material. However, specific heat of the porous material is equivalent to the solid material since this material property is mass based, not volume based. Values used for both materials are presented in Table 1.

TABLE 1

Thermophysical Properties

|  |  | Solid | Porous |
|---|---|---|---|
| Steel | Conductivity (W/m · ° C.) | 50 | 15 (30% of solid) |
|  | Density (kg/m³) | 7800 | 3900 (50% of solid) |
|  | Specific Heat (J/kg · ° C.) | 460 | 460 |
| Aluminum | Conductivity (W/m · ° C.) | 177 | 53.1 (30% of solid) |
|  | Density (kg/m³) | 2770 | 1385 (50% of solid) |
|  | Specific Heat (J/kg · ° C.) | 875 | 875 |

The objective of the "Thickness Variation" analysis was to identify the optimum cookware design using a combination of solid and porous materials. The optimum design will result in a light-weight product with even temperature distribution on the cooking surface. To accomplish this objective, the total cookware product thickness and the thickness of porous and solid material layers were varied and thermally evaluated. These analyses were completed for two different surface mediums, air and water. Table 2 presents all of the FEA runs executed.

TABLE 2

Finite Element Analyses Performed

| Total Product Thickness (mm) | Boundary Conditions Evaluated | Material Evaluated | Notes |
|---|---|---|---|
| 3.175 | Water/Air | Steel | varied thickness of solid and porous layers |
| 4.76 | Air | Steel/ Aluminum | varied thickness of solid and porous layers |

TABLE 2-continued

Finite Element Analyses Performed

| Total Product Thickness (mm) | Boundary Conditions Evaluated | Material Evaluated | Notes |
|---|---|---|---|
| 4.6 | Water/Air | Steel/ Aluminum | varied thickness and materials |
| 3.8 | Water/Air | Steel/ Aluminum | one analysis with solid cooking surface, porous core, and no solid bottom surface |
| 3.6 | Water/Air | Steel/ Aluminum | varied materials |

Figure 4:
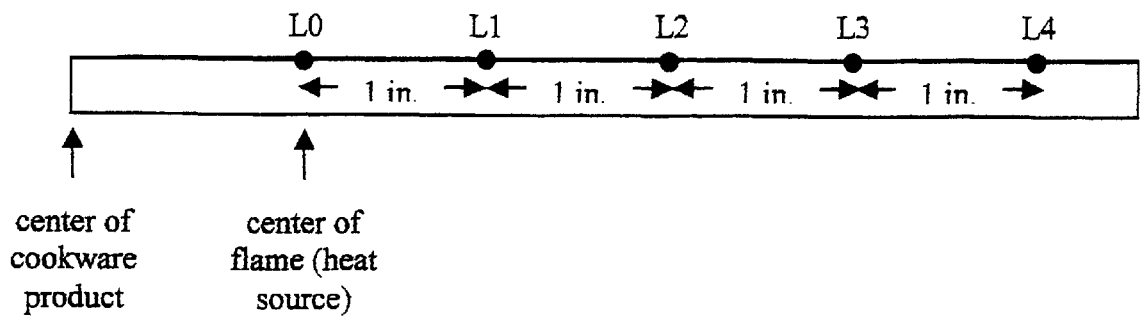
FIG. 4 shows numerical data locations with respect to the distance from the heat source of the cookware vessel.

Results for all FEA are presented for locations as defined in FIG. 4. The locations represent a point directly across from flame (L0) then range away from the flame in 1 in. increments (L1 through L4.)

Figure 13:
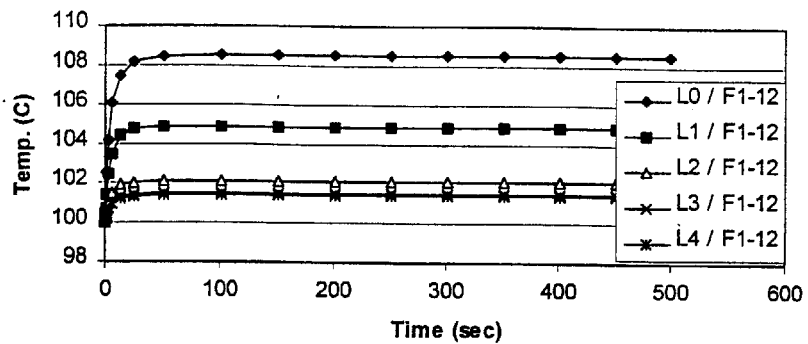
FIG. 13 shows a temperature time history plot of Run 1–12.
Figure 14:
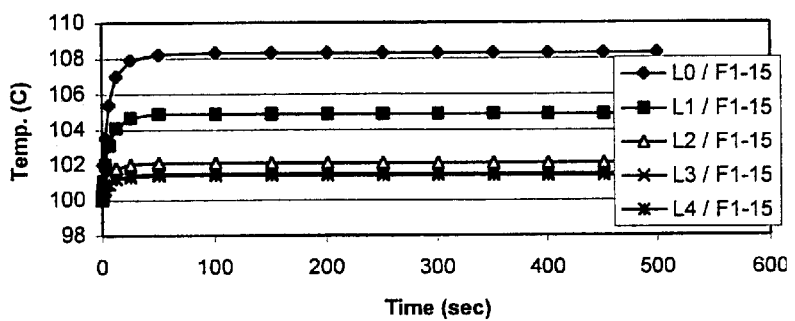
FIG. 14 shows a temperature time history plot of Run 1–15.
Figure 15:
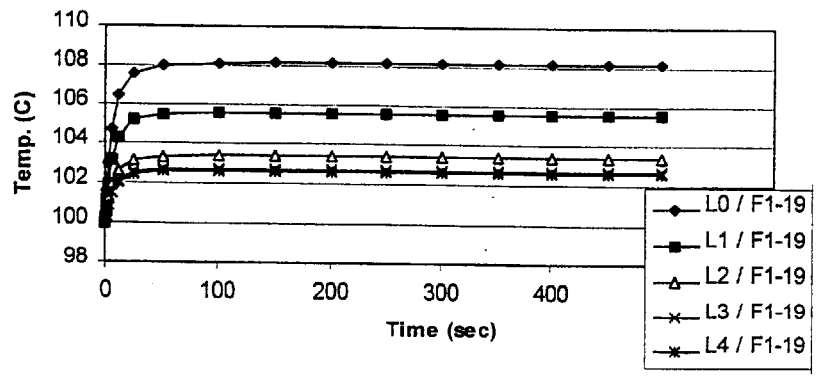
FIG. 15 shows a temperature time history plot of Run 1–19.
Figure 16:
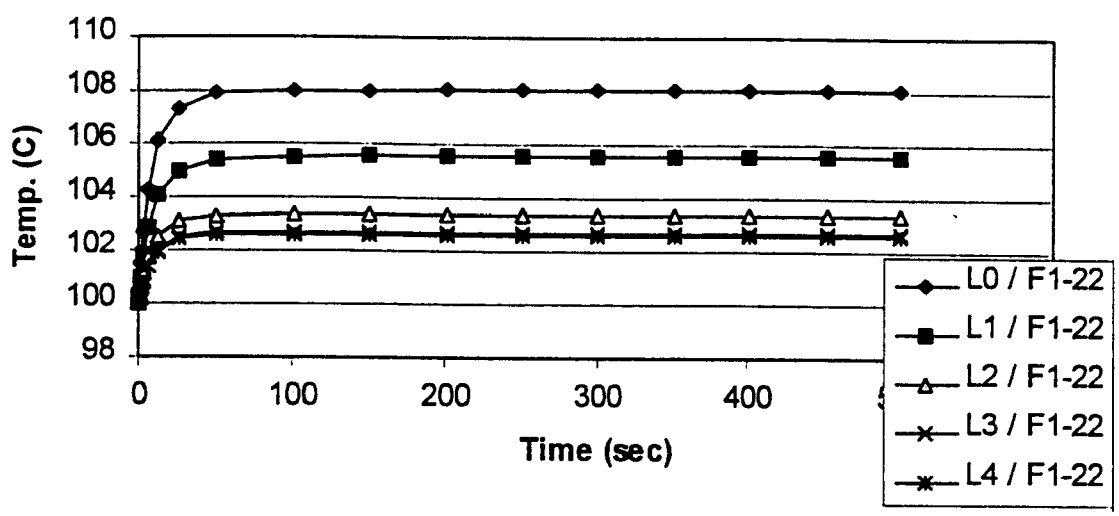
FIG. 16 shows a temperature time history plot of Run 1–22.

The initial FEA completed was for steel cooking products with total thickness of 3.175 mm and 4.76 mm. These analyses were completed for both water and air boundary conditions. The air boundary condition results indicated that the temperature distribution on the cooking surface was more evenly distributed as the solid material thickness was increased. This is due to the higher conductivity of the solid material compared to the porous material. The results also indicated that increased total thickness improved the temperature distribution on the cooking surface. The increased thickness provided more material for the heat to transfer radially away from the gas flame heat source. All temperature results for air boundary conditions and total thickness values of 3.175 mm and 4.76 mm are presented in Tables 4, 5 and 6, and FIG. 13.

Figure 18:
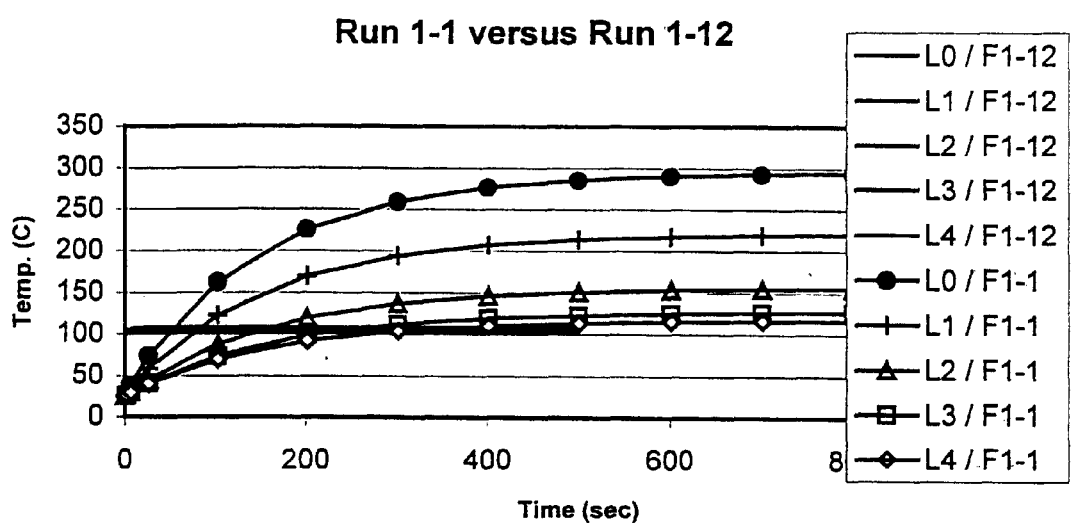
FIG. 18 shows a temperature time history plot for full porous runs for both air and water boundary conditions.

The FEA runs with water boundary conditions for steel fascia and steel foam core assumed that the water was already boiling (100° C.). This simulated a steady state thermal condition. The results indicated a more even temperature distribution on the cooking surface as compared to the same cookware product with air boundary conditions. Thus, the air boundary conditions are the worst case situation, and that any cooking condition (liquids, soup, steak, etc.) would result in better temperature distribution. FEA results and additional comments regarding water boundary condition analyses are presented in Table 8 and FIG. 18.

Figure 19:
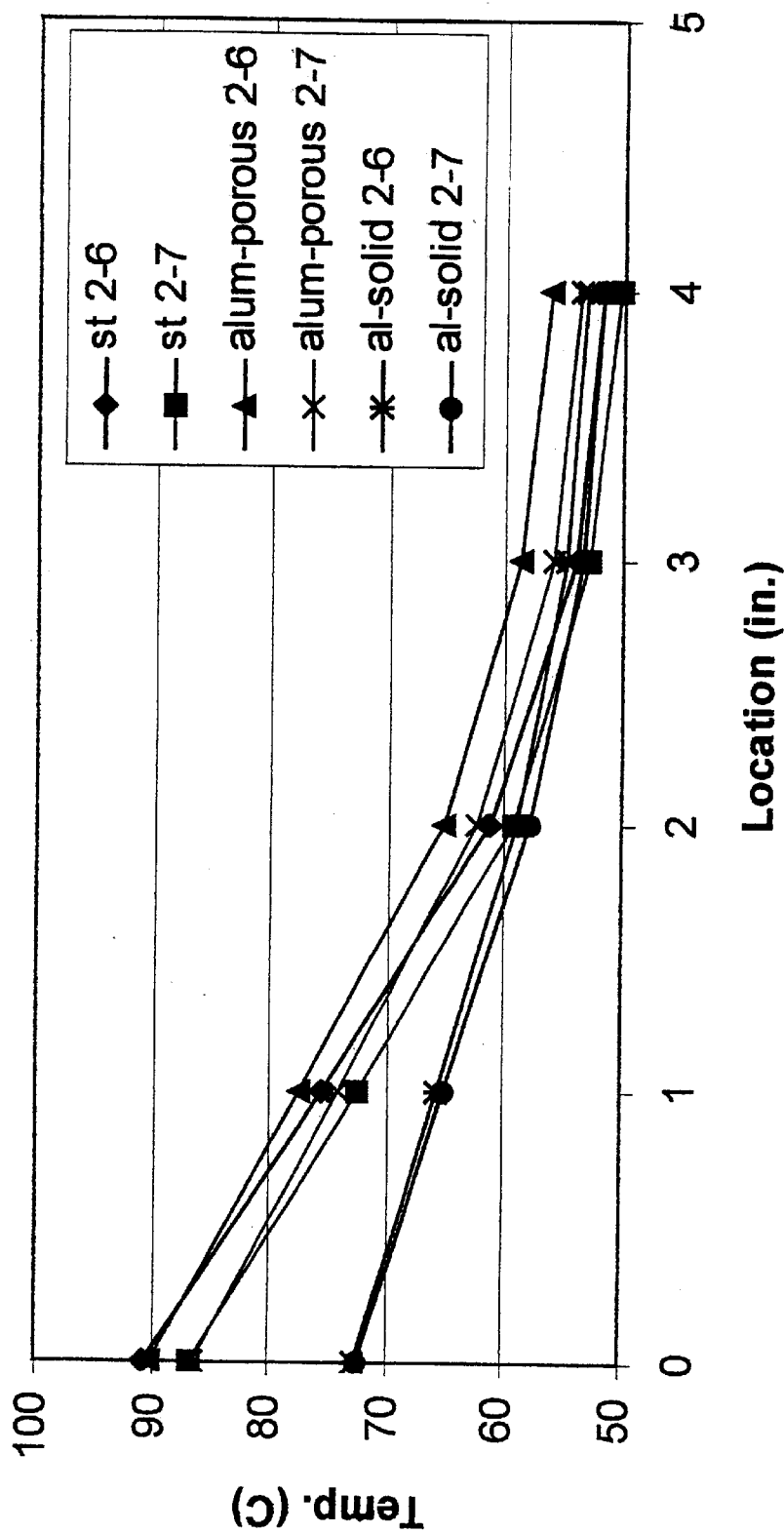
FIG. 19 shows temperature versus location away from the heating source at 100 seconds.

FEA runs for Air Boundary Conditions for solid steel and aluminum core material were made for a total thickness of 4.76 mm. FEA runs 2–6 and 2–7 presented in Tables 5, and 6 were duplicated using aluminum material for the core (both solid and porous). These results indicated that the temperature on the cooking surface was more evenly distributed when compared to the same FEA runs with all steel material. Results from this exercise are presented in Tables 9 and 10 and FIG. 19.

After reviewing the results from all of the previous FEA runs, additional FEA were made. These analyses varied the total thickness, thickness of the solid and porous layers, and the material. The temperature distribution and overall weight of the cookware product were evaluated to identify the optimal cookware design. Details and results for these analyses are presented specifically in Tables 11, 12, 13 and 14.

General conclusions regarding the FEA completed are as follows.

Figure 5:
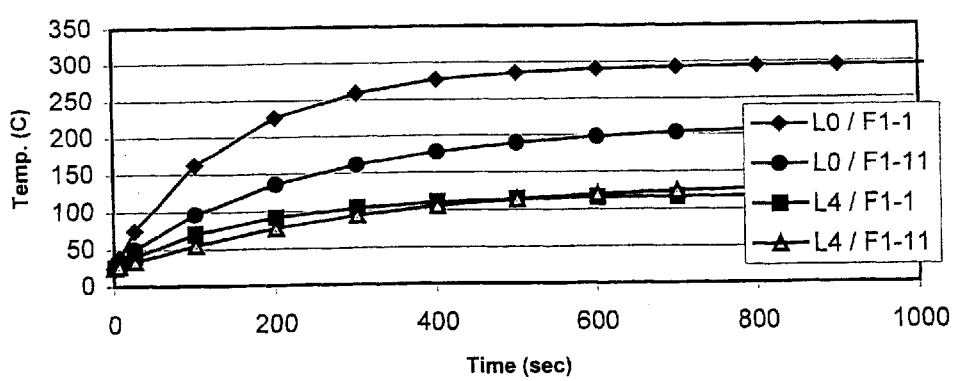
FIG. 5 shows a temperature time history plot for full porous runs for both air and water boundary conditions.

The air boundary conditions produced larger temperature variations on the cooking surface than water boundary conditions. Increasing the total material thickness improves the temperature distribution on the heating surface. Increased thickness of solid material (i.e., less porous material) improves the temperature distribution on the cooking surface. A cookware product using aluminum material has improved temperature distribution and lower weight than an identical product using steel material. The porous material heats up faster than the solid material due to its lower density (thus requiring less energy). This is evident when comparing the slopes during heating to steady state. The slope of run 1–1 is steeper than that of 1–11 at both locations (L0 and L4) presented in FIG. 5.

Figure 6:
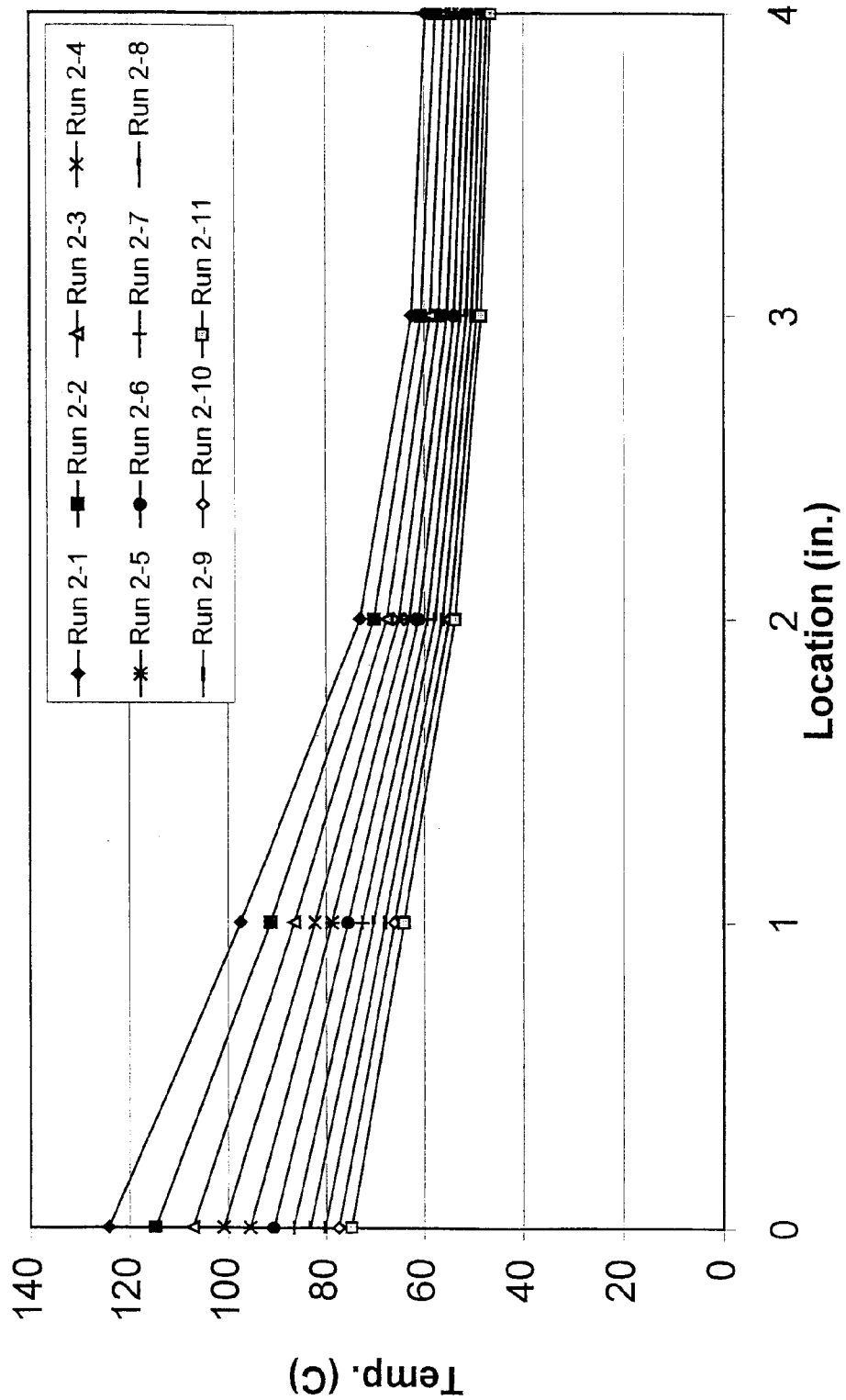
FIG. 6 shows a temperature versus distance away from the heating source at 100 seconds.
Figure 7:
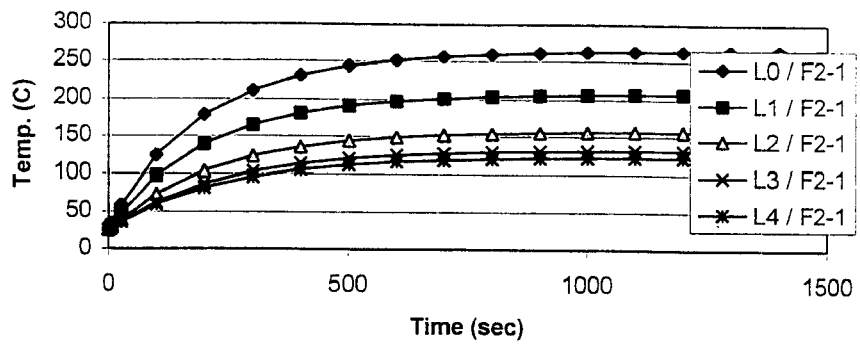
FIG. 7 shows a temperature time history graph for Run 2–1.
Figure 8:
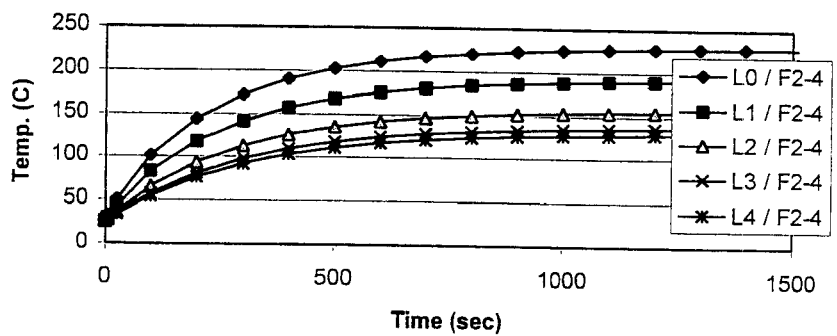
FIG. 8 shows a temperature time history graph for Run 2–4.
Figure 9:
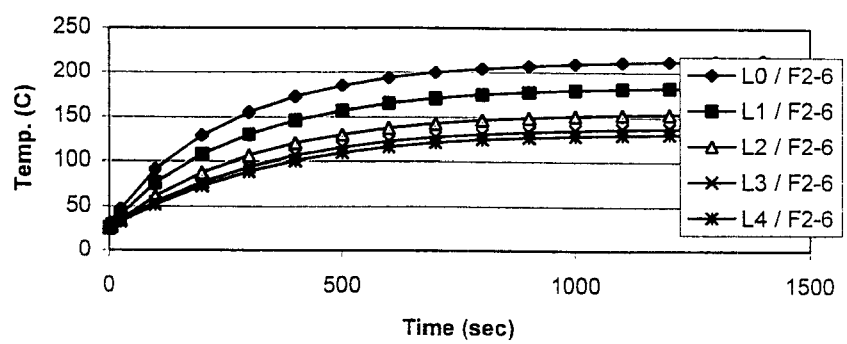
FIG. 9 shows a temperature time history for Run 2–6.
Figure 10:
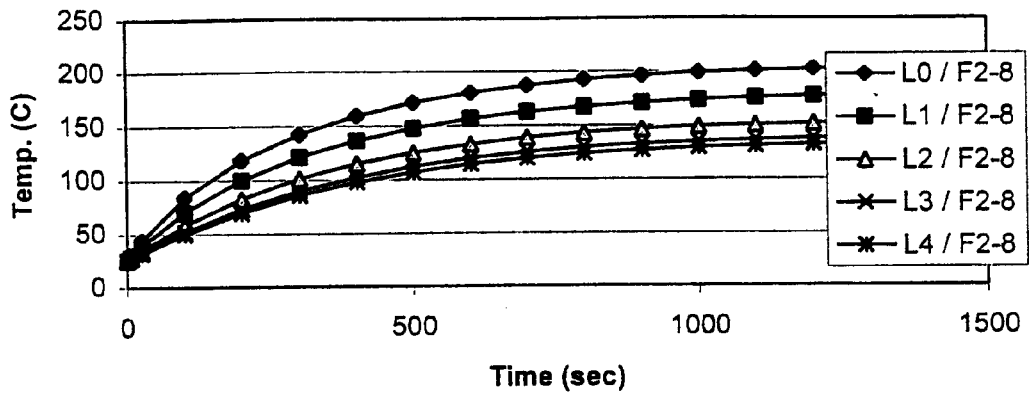
FIG. 10 shows a temperature time history for Run 2–8.
Figure 11:
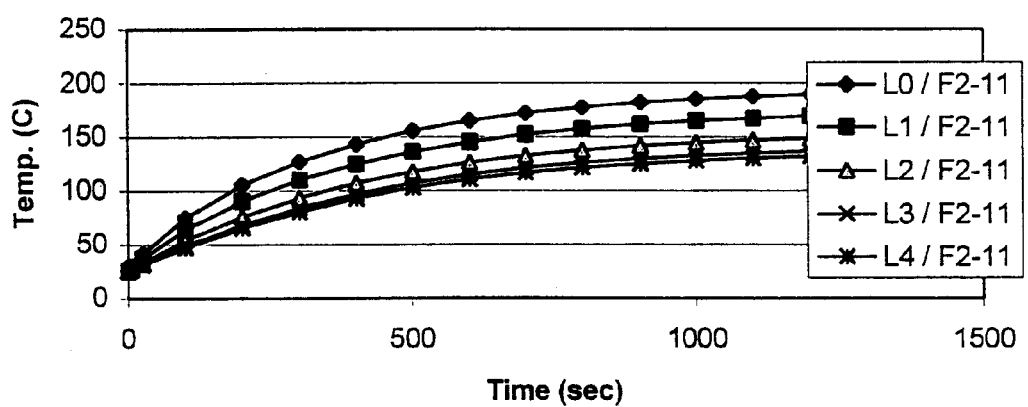
FIG. 11 shows a temperature time history for Run 2–11.

After the initial evaluation of the results from both 3.175 mm and 4.76 mm FEA runs, it was decided to further investigate the 4.76 mm thickness due to its better temperature distribution. This evaluation included additional analyses of the remaining thickness variations of porous and solid layers. In other words, all possible variations with an air boundary condition and a total thickness of 4.76 mm were performed as presented in Table 3. The peak temperatures at steady state was reached in Table 4. Table 5 presents the temperature at each location for all FEA runs at 100 seconds into the heating process. FIG. 6 presents a graph of temperature versus location away from heating source at a fixed time of 100 seconds. FIGS. 14 through 18 present the temperature time history graphs for several of the FEA runs performed with a total thickness of 4.76 mm and with air boundary conditions. Table 6 presents the weight for each porous/solid layer thickness variation. This data can be used to approximate the weight savings for the different variations solid and porous materials.

TABLE 3

FEA Runs for Total Material Thickness of 4.76 mm

| FEA Run # | Porous Layer Thickness (mm) | Total Solid Layer Thickness (mm) | Surface Medium (air or water) | Completion Status (Y or N) |
|---|---|---|---|---|
| | 4.76 mm (³⁄₁₆in.) total thickness | | | |
| 2-1 | 4.76 | 0 | air | Y |
| 2-2 | 4.284 | 0.476 | air | Y |
| 2-3 | 3.808 | 0.952 | air | Y |
| 2-4 | 3.332 | 1.428 | air | Y |
| 2-5 | 2.856 | 1.904 | air | Y |
| 2-6 | 2.38 | 2.38 | air | Y |
| 2-7 | 1.904 | 2.856 | air | Y |
| 2-8 | 1.428 | 3.332 | air | Y |
| 2-9 | 0.952 | 3.808 | air | Y |
| 2-10 | 0.476 | 4.284 | air | Y |
| 2-11 | 0 | 4.76 | air | Y |

TABLE 4

4.76 mm Total Thickness Peak Temperatures for Air Boundary Condition

All values are °C.

| Location | Run 2-1 | Run 2-2 | Run 2-3 | Run 2-4 | Run 2-5 | Run 2-6 | Run 2-7 | Run 2-8 | Run 2-9 | Run 2-10 | Run 2-11 |
|---|---|---|---|---|---|---|---|---|---|---|---|
| | p = 4.76<br>s = 0.0 | p = 4.28<br>s = 0.48 | P = 3.81<br>s = 0.95 | p = 3.33<br>s = 1.43 | p = 2.86<br>s = 1.90 | p = 2.38<br>s = 2.38 | p = 4.90<br>s = 2.86 | p = 1.43<br>s = 3.33 | P = 0.95<br>s = 3.81 | p = 0.48<br>s = 4.28 | p = 0.0<br>s = 4.76 |
| L0 | 264.1 | 249.4 | 238.2 | 229.3 | 222.0 | 216.0 | 210.9 | 206.6 | 202.7 | 199.3 | 196.3 |
| L1 | 208.0 | 201.3 | 196.1 | 191.8 | 188.3 | 185.2 | 182.6 | 180.4 | 178.4 | 176.6 | 174.9 |
| L2 | 157.2 | 157.1 | 156.9 | 156.7 | 156.4 | 156.0 | 155.7 | 155.4 | 155.0 | 154.7 | 154.3 |
| L3 | 132.0 | 134.4 | 136.2 | 137.6 | 138.8 | 139.7 | 140.5 | 141.1 | 141.6 | 142.0 | 142.3 |
| L4 | 122.7 | 125.6 | 128.0 | 130.0 | 131.6 | 133.0 | 134.2 | 135.2 | 136.0 | 136.7 | 137.3 |
| DT (L0–L1) | 56.1 | 48.1 | 42.1 | 37.5 | 33.7 | 30.8 | 28.3 | 26.2 | 24.3 | 22.7 | 21.4 |
| DT (L0–L2) | 106.9 | 92.3 | 81.3 | 72.6 | 65.6 | 60.0 | 55.2 | 51.2 | 47.7 | 44.6 | 42.0 |
| DT (L0–L3) | 132.1 | 115.0 | 102.0 | 91.7 | 83.2 | 76.3 | 70.4 | 65.5 | 61.1 | 57.3 | 54.0 |
| DT (L0–L4) | 141.4 | 123.8 | 110.2 | 99.3 | 90.4 | 83.0 | 76.7 | 71.4 | 66.7 | 62.6 | 59.0 |
| dT (from full solid) | 82.4 | 64.8 | 51.2 | 40.3 | 31.4 | 24.0 | 17.7 | 12.4 | 7.7 | 3.6 | 0 | p = porous thickness (mm),
s = solid thickness (mm)

TABLE 5

4.76 mm Total Thickness Temperatures at 100 seconds for Air Boundary Condition.

All values are °C.

| Location | Run 2-1 | Run 2-2 | Run 2-3 | Run 2-4 | Run 2-5 | Run 2-6 | Run 2-7 | Run 2-8 | Run 2-9 | Run 2-10 | Run 2-11 |
|---|---|---|---|---|---|---|---|---|---|---|---|
| | p = 4.76<br>s = 0.0 | p = 4.28<br>s = 0.48 | P = 3.81<br>s = 0.95 | p = 3.33<br>s = 1.43 | p = 2.86<br>s = 1.90 | p = 2.38<br>s = 2.38 | p = 1.90<br>s = 2.86 | p = 1.43<br>s = 3.33 | p = 0.95<br>s = 3.81 | p = 0.48<br>s = 4.28 | p = 0.0<br>s = 4.76 |
| 0 | 124.1 | 114.7 | 107.1 | 100.8 | 95.4 | 90.8 | 86.7 | 83.3 | 80.1 | 77.3 | 74.8 |
| 1 | 97.3 | 91.4 | 86.5 | 82.3 | 78.7 | 75.5 | 72.6 | 70.2 | 67.9 | 65.9 | 64.0 |
| 2 | 73.0 | 70.1 | 67.5 | 65.1 | 63.0 | 61.1 | 59.3 | 57.8 | 56.3 | 55.0 | 53.8 |
| 3 | 62.5 | 60.6 | 58.7 | 57.0 | 55.4 | 54.0 | 52.7 | 51.5 | 50.4 | 49.4 | 48.5 |
| 4 | 59.7 | 57.7 | 56.0 | 54.4 | 52.9 | 51.6 | 50.4 | 49.4 | 48.4 | 47.4 | 46.6 |
| DT (L0–L1) | 26.8 | 23.3 | 20.6 | 18.5 | 16.7 | 15.3 | 14.1 | 13.1 | 12.2 | 11.4 | 10.8 |
| DT (L0–L2) | 51.1 | 44.6 | 39.6 | 35.7 | 32.4 | 29.7 | 27.4 | 25.5 | 23.8 | 22.3 | 21.0 |
| DT (L0–L3) | 61.6 | 54.1 | 48.4 | 43.8 | 40.0 | 36.8 | 34.0 | 31.8 | 29.7 | 27.9 | 26.3 |
| DT (L0–L4) | 64.4 | 57.0 | 51.1 | 46.4 | 42.5 | 39.2 | 36.3 | 33.9 | 31.7 | 29.9 | 28.2 |
| DT (from full solid) | 36.2 | 28.8 | 22.9 | 18.2 | 14.3 | 11.0 | 8.1 | 5.7 | 3.5 | 1.7 | 0 | p = porous thickness (mm),
s = solid thickness (mm)

TABLE 6

Weight Calculations for 4.76 mm Total Material Thickness

| | Run 2-1 | Run 2-2 | Run 2-3 | Run 2-4 | Run 2-5 | Run 2-6 | Run 2-7 | Run 2-8 | Run 2-9 | Run 2-10 | Run 2-11 |
|---|---|---|---|---|---|---|---|---|---|---|---|
| Thickness of Porous and Solid Layers (mm) | p = 4.76<br>s = 0.0 | p = 4.28<br>s = 0.48 | p = 3.81<br>s = 0.95 | p = 13.33<br>s = 1.43 | p = 2.86<br>s = 1.90 | p = 2.38<br>s = 2.38 | p = 1.90<br>s = 2.86 | p = 1.43<br>s = 3.33 | p = 0.95<br>s = 3.81 | p = 0.48<br>s = 4.28 | p = 0.0<br>s = 4.76 |
| Weight of Porous Material (lbs) | 8.31 | 7.47 | 6.65 | 5.81 | 4.99 | 4.16 | 3.32 | 2.50 | 1.66 | 0.84 | 0.00 |
| Weight of Solid Material (lbs) | 0.00 | 1.68 | 3.32 | 4.99 | 6.63 | 8.31 | 9.99 | 11.63 | 13.30 | 14.95 | 16.62 |
| Total Weight (lbs) | 8.31 | 9.15 | 9.97 | 10.81 | 11.63 | 12.47 | 13.30 | 14.12 | 14.96 | 15.78 | 16.62 |
| Difference from Full Solid (lbs) | 8.31 | 7.47 | 6.65 | 5.81 | 4.99 | 4.16 | 3.32 | 2.50 | 1.66 | 0.84 | 0.00 |
| % Difference from Full Solid | 50.0 | 45.0 | 40.0 | 35.0 | 30.0 | 25.0 | 20.0 | 15.0 | 10.0 | 5.0 | 0.00 | p = porous thickness (mm),
s = solid thickness (mm)

Figure 12:
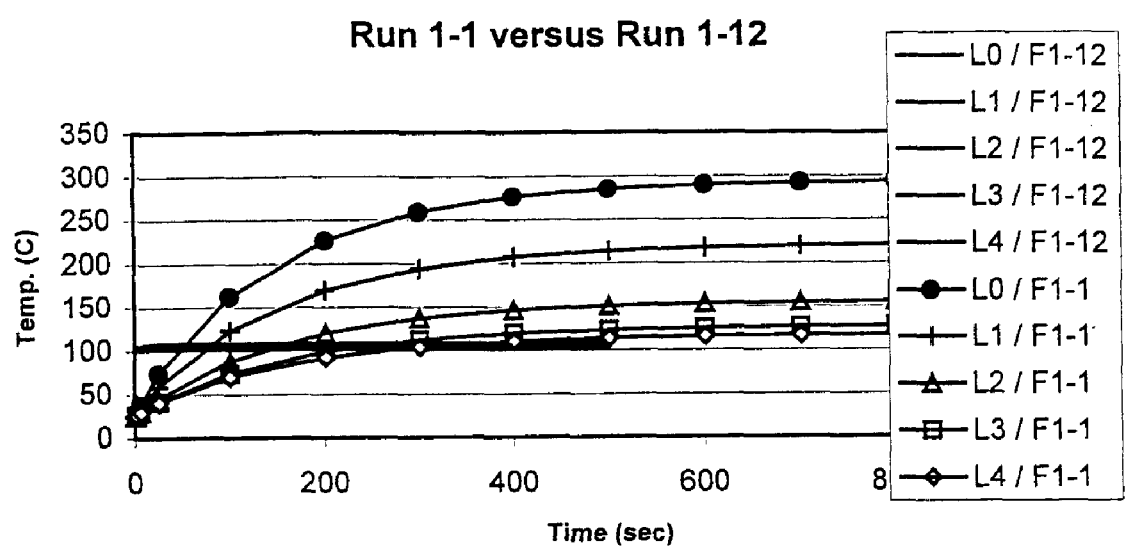
FIG. 12 shows a temperature time history plot for full porous runs for both air and water boundary conditions.

FEA analysis was made for Water Boundary Conditions for a total thickness of 3.175 mm. FIG. 12 presents the thermal time history results for full porous material for both the water and air boundary conditions. The water boundary condition analyses assumed that the water was already at boiling temperature. In reality, this thermal system will require more time to reach steady-state than indicated on these graphs because these analyses do not represent the heating of the water. These results do indicate that regardless of the water temperature, the temperature variation within the cookware product will be small compared to air boundary conditions. Table 7 presents the peak steady state temperatures for water boundary condition for a total thickness of 3.175 mm. All temperature time history plots for water boundary conditions for a total thickness of 3.175 mm are presented on FIG. 13 through FIG. 16.

There is a relatively small temperature variation on the cooking surface, regardless of the porous material thickness. The temperature magnitude for water boundary conditions is relatively low compared to air boundary conditions due to the higher heat loss to the medium in contact with the heating source.

FEA runs with a water boundary condition for a total thickness of 4.76 mm were not performed since the results from the 3.175 mm runs indicated relatively even temperature distributions. Results from these analyses would indicate slightly smaller temperature variation on the heating surface.

TABLE 7

3.175 mm total thickness peak temperature results for water boundary condition.

All values are ° C.

|  | 1–12<br>p = 3.17 mm<br>s = 0.0 mm | 1–15<br>p = 2.22 mm<br>s = 0.95 mm | 1–19<br>p = 0.95 mm<br>s = 2.22 mm | 1–22<br>p = 0.00 mm<br>s = 3.17 mm |
|---|---|---|---|---|
| L0 | 108.5 | 108.3 | 108.2 | 108.1 |
| L1 | 104.9 | 104.9 | 105.6 | 105.6 |
| L2 | 102.1 | 102.1 | 103.4 | 103.4 |
| L3 | 101.5 | 101.5 | 102.7 | 102.7 |
| L4 | 101.4 | 101.4 | 102.6 | 102.6 |
| dT (L0–L1) | 3.6 | 3.4 | 2.6 | 2.5 |
| dT (L0–L2) | 6.4 | 6.2 | 4.8 | 4.7 |
| dT (L0–L3) | 7.0 | 6.8 | 5.5 | 5.4 |
| dT (L0–L4) | 7.1 | 6.9 | 5.6 | 5.5 | p = porous thickness, s = solid thickness

Figure 17:
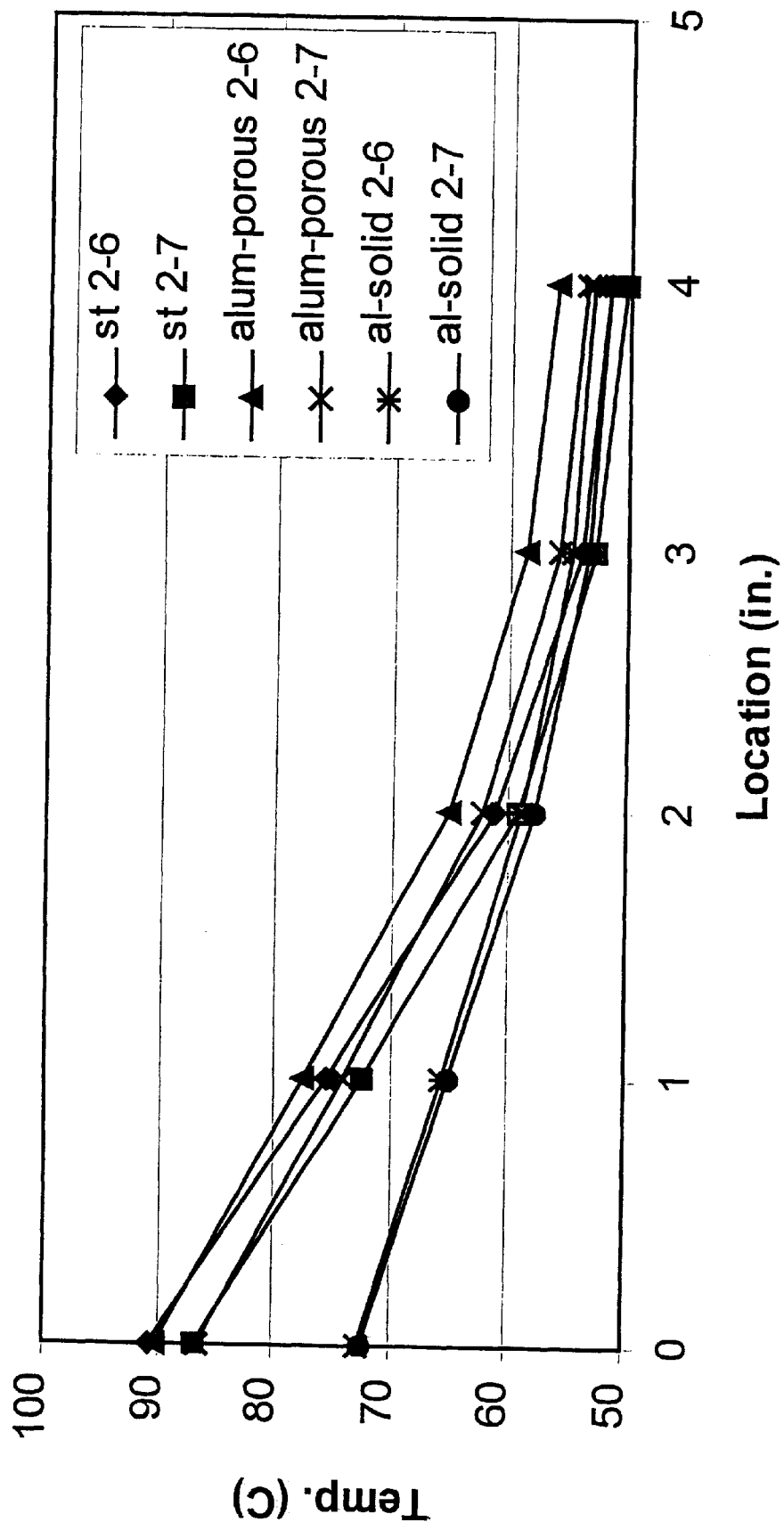
FIG. 17 shows a temperature versus location away from the heating source at 100 seconds.

Additional FEA runs for Air Boundary Conditions similar to Runs 2–6 and 2–7 (as described in Table 5 and 6) were performed with Aluminum (both porous and solid) material sandwiched by solid steel material. The material properties for aluminum presented in Table 1 were assumed to be similar to 2024-T6 (4.5% Cu, 1.5% Mg, 0.6% Mn). Table 8 presents the calculated peak temperature and the weight for both the solid steel/porous steel runs (st2–6 and st2–7), solid steel/porous aluminum runs (alp2–6 and alp2–7), and solid steel/solid aluminum (als2–6 and als2–7). Table 10 presents temperatures at 100 seconds for the FEA runs. FIG. 17 presents temperature versus location data after 100 seconds. The results indicate that the aluminum core provides better radial heat transfer than the porous steel material, with the solid aluminum providing the best performance.

TABLE 8

3.175 mm total thickness peak temperature results for water boundary condition.

All values are ° C.

|  | 1–12<br>p = 3.17 mm<br>s = 0.0 mm | 1–15<br>p = 2.22 mm<br>s = 0.95 mm | 1–19<br>p = 0.95 mm<br>s = 2.22 mm | 1–22<br>p = 0.00 mm<br>s = 3.17 mm |
|---|---|---|---|---|
| L0 | 108.5 | 108.3 | 108.2 | 108.1 |
| L1 | 104.9 | 104.9 | 105.6 | 105.6 |
| L2 | 102.1 | 102.1 | 103.4 | 103.4 |
| L3 | 101.5 | 101.5 | 102.7 | 102.7 |
| L4 | 101.4 | 101.4 | 102.6 | 102.6 |
| dT (L0–L1) | 3.6 | 3.4 | 2.6 | 2.5 |
| dT (L0–L2) | 6.4 | 6.2 | 4.8 | 4.7 |
| dT (L0–L3) | 7.0 | 6.8 | 5.5 | 5.4 |
| dT (L0–L4) | 7.1 | 6.9 | 5.6 | 5.5 | p = porous thickness, s = solid thickness

Additional finite element analyses were performed with new solid and core material thickness variations and with different variations of steel and aluminum materials. Table 9 and Table 10 present the peak temperature and the temperature at 100 seconds for FEA Runs A through H with air boundary conditions. Table 11 presents the results with water boundary conditions. Note that water boundary condition results are representative of the peak temperatures and the temperature at 100 seconds since the thermal system reaches steady state condition at approximately 100 seconds.

Table 12 presents the calculated weight of the different variations of material for two different cookware geometries.

TABLE 9

Peak Temperature Comparison of FEA Runs with Air Boundary Conditions

|  | Run A<br>1.0 mm solid alum.<br>2.6 mm porous alum.<br>1.0 mm solid alum. | Run B<br>0.8 mm solid alum.<br>3.0 mm porous alum.<br>0.8 mm solid alum. | Run C<br>0.8 mm solid steel<br>3.0 mm porous steel<br>0.8 mm solid steel | Run D<br>0.8 mm solid steel<br>3.0 mm solid alum.<br>0.8 mm solid steel | Run E<br>0.8 mm solid steel<br>3.0 mm solid alum.<br>no bottom layer |
|---|---|---|---|---|---|
| L0 | 175.4 | 177.9 | 197.0 | 170.9 | 209.1 |
| L1 | 164.4 | 165.7 | 175.7 | 161.8 | 181.8 |
| L2 | 153.5 | 153.7 | 155.2 | 152.9 | 155.7 |
| L3 | 146.9 | 146.5 | 143.2 | 147.5 | 141.0 |
| L4 | 144.1 | 143.4 | 138.2 | 145.1 | 134.9 |
| dT (L0–L1) | 11.0 | 12.2 | 21.3 | 9.1 | 27.3 |
| dT (L0–L2) | 21.9 | 24.2 | 41.8 | 18.0 | 53.4 |
| dT (L0–L3) | 28.5 | 31.4 | 53.8 | 23.4 | 68.1 |
| dT (L0–L4) | 31.3 | 34.5 | 58.8 | 25.8 | 74.2 |

TABLE 9-continued

Peak Temperature Comparison of FEA Runs with Air Boundary Conditions

|  | Run F<br>0.3 mm solid steel<br>3.0 mm porous alum.<br>0.3 mm solid steel | Run G<br>0.3 mm solid alum.<br>3.0 mm porous alum.<br>0.3 mm solid alum. | Run H<br>0.3 mm solid steel<br>3.0 mm solid alum.<br>0.3 mm solid steel |
|---|---|---|---|
| L0 | 207.0 | 193.2 | 172.8 |
| L1 | 180.8 | 173.8 | 162.9 |
| L2 | 155.8 | 154.9 | 153.3 |
| L3 | 141.6 | 143.9 | 147.4 |
| L4 | 135.7 | 139.3 | 144.8 |
| dT (L0–L1) | 26.2 | 19.4 | 9.9 |
| dT (L0–L2) | 51.2 | 38.3 | 19.5 |
| dT (L0–L3) | 65.4 | 49.3 | 25.4 |
| DT (L0–L4) | 71.3 | 53.9 | 28.0 |

Temperature units are ° C.

TABLE 10

Temperature at 100 seconds for FEA Runs with Air Boundary Conditions

|  | Run A<br>1.0 mm solid alum.<br>2.6 mm porous alum.<br>1.0 mm solid alum. | Run B<br>0.8 mm solid alum<br>3.0 mm porous alum.<br>0.8 mm solid alum. | Run C<br>0.8 mm solid steel<br>3.0 mm porous alum.<br>0.8 mm solid steel | Run D<br>0.8 mm solid steel<br>3.0 mm solid alum.<br>0.8 mm solid steel | Run E<br>0.8 mm solid steel<br>3.0 mm solid alum.<br>no bottom layer |
|---|---|---|---|---|---|
| L0 | 94.8 | 99.0 | 99.4 | 74.5 | 89.0 |
| L1 | 86.3 | 89.5 | 85.4 | 68.0 | 74.7 |
| L2 | 77.8 | 80.2 | 72.0 | 61.6 | 61.2 |
| L3 | 72.7 | 74.6 | 64.5 | 57.7 | 54.4 |
| L4 | 70.5 | 72.2 | 61.6 | 56.0 | 52.0 |
| DT (L0–L1) | 8.5 | 9.5 | 14.0 | 6.5 | 14.3 |
| DT (L0–L2) | 17.0 | 18.8 | 27.4 | 12.9 | 27.8 |
| DT (L0–L3) | 22.1 | 24.4 | 34.9 | 16.8 | 34.6 |
| DT (L0–L4) | 24.3 | 26.8 | 37.8 | 18.5 | 37.0 |

|  | Run F<br>0.3 mm solid steel<br>3.0 mm porous alum.<br>0.3 mm solid steel | Run G<br>0.3 mm solid alum.<br>3.0 mm porous alum.<br>0.3 mm solid alum. | Run H<br>0.3 mm solid steel<br>3.0 mm solid alum.<br>0.3 mm solid steel |
|---|---|---|---|
| L0 | 128.2 | 126.7 | 86.8 |
| L1 | 109.0 | 111.1 | 79.3 |
| L2 | 90.6 | 96.0 | 71.9 |
| L3 | 80.4 | 87.2 | 67.4 |
| L4 | 76.4 | 83.6 | 65.5 |
| DT (L0–L1) | 19.2 | 15.6 | 7.5 |
| DT (L0–L2) | 37.6 | 30.7 | 14.9 |
| DT (L0–L3) | 47.8 | 39.5 | 19.4 |
| DT (L0–L4) | 51.8 | 43.1 | 21.3 |

Temperature units are ° C.

TABLE 11

Temperature of FEA Runs with Water Boundary Conditions

|  | Run A<br>1.0 mm solid alum.<br>2.6 mm porous alum.<br>1.0 mm solid alum. | Run B<br>0.8 mm solid alum.<br>3.0 mm porous alum<br>0.8 mm solid alum. | Run C<br>0.8 mm solid steel<br>3.0 mm porous alum.<br>0.8 mm solid steel | Run D<br>0.8 mm solid steel<br>3.0 mm solid alum.<br>0.8 mm solid steel | Run E<br>0.8 mm solid steel<br>3.0 mm solid alum.<br>no bottom layer |
|---|---|---|---|---|---|
| L0 | 107.3 | 107.4 | 107.8 | 107.1 | 108.8 |
| L1 | 105.4 | 105.4 | 105.5 | 105.3 | 106.5 |
| L2 | 103.6 | 103.6 | 103.5 | 103.6 | 104.6 |
| L3 | 102.9 | 102.9 | 102.8 | 102.9 | 103.6 |
| L4 | 102.7 | 102.7 | 102.6 | 102.7 | 102.9 |
| dT (L0–L1) | 1.9 | 2.0 | 2.3 | 1.8 | 2.3 |
| dT (L0–L2) | 3.7 | 3.8 | 4.3 | 3.5 | 4.2 |
| dT (L0–L3) | 4.4 | 4.5 | 5.0 | 4.2 | 5.2 |
| dT (L0–L4) | 4.6 | 4.7 | 5.2 | 4.4 | 5.9 |

TABLE 11-continued

Temperature of FEA Runs with Water Boundary Conditions

|  | Run F<br>0.3 mm solid steel<br>3.0 mm porous alum.<br>0.3 mm solid steel | Run G<br>0.3 mm solid alum.<br>3.0 mm porous alum.<br>0.3 mm solid alum. | Run H<br>0.3 mm solid steel<br>3.0 mm solid alum.<br>0.3 mm solid steel |
|---|---|---|---|
| L0 | 108.0 | 107.7 | 107.2 |
| L1 | 105.5 | 105.5 | 105.3 |
| L2 | 103.4 | 103.5 | 103.6 |
| L3 | 102.7 | 102.8 | 102.9 |
| L4 | 102.6 | 102.6 | 102.7 |
| dT (L0–L1) | 2.5 | 2.2 | 1.9 |
| dT (L0–L2) | 4.6 | 4.2 | 3.6 |
| dT (L0–L3) | 5.3 | 4.9 | 4.3 |
| dT (L0–L4) | 5.4 | 5.1 | 4.5 |

Temperature units are ° C.

TABLE 12

Weight Calculation Results

| FEA Run ID | Weight (lbs)<br>Diameter = 12 in.<br>Rim Height = 2 in. | Weight (lbs)<br>Diameter = 10 in.<br>Rim Height = 5 in. |
|---|---|---|
| Run A | 2.7 | 4.1 |
| Run B | 2.6 | 3.8 |
| Run C | 5.0 | 7.4 |
| Run D | 6.2 | 9.3 |
| Run E | 4.4 | 6.5 |
| Run F | 2.7 | 3.9 |
| Run G | 1.7 | 2.6 |
| Run H | 3.9 | 5.8 |

All FEA analyses within this study used a medium gas flame heat source. Electric resistance, convective heating, and induction heat sources will present relatively constant heat distributions over the entire heating surface of the cookware product, thus resulting in minimal, if any "hot spots" regardless of the cooking material. Note that analyses simulating electric resistance and convective and inductive heating sources were not performed because it was assumed that these results would show a constant heat distribution.

In a preferred embodiment, the non-porous material would be made of stainless steel or aluminum. The foamed material would be made of aluminum or stainless steel having a thickness of 3.8–4.2 mm. In this embodiment, there would be a reduction of hot spots, providing a constant heat distribution over the entire vessel and a decrease in weight.

With vessels with higher rims that would traditionally hold soups, stews, boiling water, pasta, etc. where the water boundary conditions apply, the maximum amount of metal foam and the minimum amount of fascia should be incorporated. In these conditions, the material inside the vessel is helping to heat the metals. Vessels intended for frying or sauteing with a 21" rim height should incorporate a higher density metal foam for optimum conductivity.

Accordingly, while only a few embodiments of the present invention have been shown and described, it is obvious that many changes and modifications may be made thereunto without departing from the spirit and scope of the invention.

What is claimed is:

1. A cooking vessel comprising:
   a non-porous shell material forming a top and bottom surface; and
   an inner foam layer sandwiched between said non-porous top and bottom surface, said inner foam layer comprising a foamed making selected from the group consisting of aluminum, stainless steel, copper and cast iron.

2. The cooking vessel according to claim 1 further comprising a finishing material on said non-porous top and bottom surface for use with food products.

3. The cooking vessel according to claim 1, wherein said inner foam layer is 3–5 mm thick.

4. The cooking vessel according to claim 1, wherein said non-porous shell material is selected from the group consisting of stainless steel, aluminum, cast iron, and copper.

5. A method of manufacturing a cooking vessel comprising:
   forming a metal foam core; and
   applying a shell of non-porous material to said foam core.

6. The method according to claim 5 further comprising applying a finishing material to said shell, said finishing material being suitable for use with food products.

7. The method according to claim 5, wherein the foam core is formed by mixing metal powder and gas-splitting propellent powder and hot compacting the mixture to a semi-finished product at a temperature at which the joining of the metal powder particles takes place primarily by diffusion.

8. A method of manufacturing a cooking vessel comprising:
   forming a metal foam core;
   producing a shell of non-porous material on said metal foam core during the formation of the metal foam core.

9. The method according to claim 8 further comprising applying a finishing material to said shell, said finishing material being suitable for use with food products.

10. The method according to claim 8 wherein the foam core is formed by mixing metal powder and gas-splitting propellent powder and hot compacting the mixture to a semi-finished product at a temperature at which the joining of the metal powder particles takes place primarily by diffusion.

\* \* \* \* \*